US012668009B2

(12) United States Patent
Nesaki et al.

(10) Patent No.: US 12,668,009 B2
(45) Date of Patent: Jun. 30, 2026

(54) CONTROLLER FOR INJECTION MOLDING MACHINE, INJECTION MOLDING MACHINE, AND CONTROL METHOD FOR INJECTION MOLDING MACHINE

(71) Applicant: SUMITOMO HEAVY INDUSTRIES, LTD., Tokyo (JP)

(72) Inventors: Yuta Nesaki, Chiba (JP); Yuichi Inada, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 50 days.

(21) Appl. No.: 18/443,558

(22) Filed: Feb. 16, 2024

(65) Prior Publication Data

US 2024/0335993 A1 Oct. 10, 2024

(30) Foreign Application Priority Data

Apr. 4, 2023 (JP) ................................. 2023-061027

(51) Int. Cl.
| | |
|---|---|
| *B29C 45/77* | (2006.01) |
| *B29C 45/50* | (2006.01) |
| *B29C 45/76* | (2006.01) |
| *B29K 67/00* | (2006.01) |

(52) U.S. Cl.
CPC .......... *B29C 45/77* (2013.01); *B29C 45/5008* (2013.01); *B29C 2045/7606* (2013.01); *B29C 2945/76006* (2013.01); *B29C 2945/7621* (2013.01); *B29C 2945/76257* (2013.01); *B29C 2945/76498* (2013.01); *B29C 2945/76598* (2013.01); *B29C 2945/76665* (2013.01); *B29C 2945/76846* (2013.01);

(Continued)

(58) Field of Classification Search
CPC ..................................................... B29C 45/77
See application file for complete search history.

(56) References Cited

U.S. PATENT DOCUMENTS

| | | | | |
|---|---|---|---|---|
| 5,534,213 | A | * | 7/1996 | Epling ................ B29C 45/0005 264/328.18 |
| 5,723,079 | A | * | 3/1998 | Fujita ..................... B29C 45/77 425/149 |

(Continued)

FOREIGN PATENT DOCUMENTS

| | | |
|---|---|---|
| CN | 106945223 | 7/2017 |
| DE | 10 2011 116 397 | 4/2012 |

(Continued)

*Primary Examiner* — Benjamin A Schiffman
(74) *Attorney, Agent, or Firm* — IPUSA, PLLC

(57) ABSTRACT

A controller is for an injection molding machine including an injecting member configured to push a molding material in a forward direction, the molding material containing a bioplastic; and an injection drive source configured to cause the injecting member to travel forward or backward. The controller is configured to perform filling in which a forward travel speed of the injecting member is controlled so that an actual value of a pressure applied from the injecting member to the molding material does not exceed an upper limit of the pressure. In at least a part of the filling, a value of from 550 mm/s through 700 mm/s is settable as a set value of the forward travel speed of the injecting member, and a value of 200 MPa or higher is settable as the upper limit of the pressure.

10 Claims, 8 Drawing Sheets

(52) U.S. Cl.
CPC .............. *B29C 2945/76859* (2013.01); *B29K 2067/046* (2013.01); *B29K 2995/006* (2013.01)

(56) References Cited

U.S. PATENT DOCUMENTS

| | | | | |
|---|---|---|---|---|
| 5,846,470 A | * | 12/1998 | Funatsu | .................. B29C 45/14 264/328.18 |
| 9,744,705 B2 | * | 8/2017 | Tajika | ................... B29C 45/762 |
| 2006/0065998 A1 | | 3/2006 | Takigawa | |
| 2006/0131788 A1 | * | 6/2006 | Takigawa | .............. B29C 45/561 264/318 |
| 2006/0246166 A1 | * | 11/2006 | Hsu | ......................... B29C 35/16 425/143 |
| 2012/0098160 A1 | | 4/2012 | Watanabe et al. | |
| 2015/0080519 A1 | * | 3/2015 | Abe | ...................... C08F 255/02 524/509 |
| 2018/0361632 A1 | * | 12/2018 | Yokomizo | .............. B29C 70/46 |

| | | | | |
|---|---|---|---|---|
| 2021/0129404 A1 | * | 5/2021 | Eynon | ................. B29C 45/0005 |
| 2022/0168928 A1 | * | 6/2022 | Kralits | .................. B29C 44/585 |
| 2023/0166438 A1 | * | 6/2023 | Hotta | ..................... B29C 45/73 700/200 |
| 2024/0157617 A1 | * | 5/2024 | Matsunaga | ............. B29C 45/76 |
| 2024/0217153 A1 | * | 7/2024 | Hano | ................... B29C 45/766 |
| 2024/0308122 A1 | * | 9/2024 | Hotta | ...................... B29C 45/76 |
| 2024/0335992 A1 | * | 10/2024 | Nesaki | ................... B29C 45/78 |
| 2024/0335994 A1 | * | 10/2024 | Nesaki | ................... B29C 45/78 |
| 2024/0335997 A1 | * | 10/2024 | Nesaki | ................... B29C 45/18 |
| 2024/0399633 A1 | * | 12/2024 | Matsunaga | ............. B29C 45/77 |
| 2024/0416569 A1 | * | 12/2024 | Matsunaga | ............. B29C 45/84 |

FOREIGN PATENT DOCUMENTS

| | | | | |
|---|---|---|---|---|
| JP | | 2005022109 A | * | 1/2005 |
| JP | | 2008-254302 | | 10/2008 |
| JP | | 2010-247331 | | 11/2010 |
| WO | | 2004/103682 | | 12/2004 |

* cited by examiner

791

792

793

794

CONTROLLER FOR INJECTION MOLDING MACHINE, INJECTION MOLDING MACHINE, AND CONTROL METHOD FOR INJECTION MOLDING MACHINE

CROSS-REFERENCE TO RELATED APPLICATIONS

This application is based upon and claims priority to Japanese Patent Application No. 2023-061027, filed on Apr. 4, 2023, the entire contents of which are incorporated herein by reference.

BACKGROUND

1. Technical Field

The present disclosure relates to controllers for injection molding machines, injection molding machines, and control methods for injection molding machines.

2. Description of Related Art

Injection molding machines include a mold clamping part configured to open and close a mold part, and an injection part configured to inject a molding material into the mold part. The injection part includes a cylinder configured to heat the molding material, and a screw provided in the cylinder. The molding material is charged into the mold part by forward travel of the screw. There have been reports on using environmental low-load-type materials as the molding material, and biodegradable materials are exemplified as an example of the environmental low-load-type materials.

In recent years, bioplastics have been considered as the molding material for injection molding. Bioplastics are a generic term of biomass plastics and biodegradable plastics. Biomass plastics are plastics whose raw materials are biological resources such as plants. Biodegradable plastics are plastics that are eventually degraded to carbon dioxide and water by the action of microorganisms.

Bioplastics tend to involve thermal deterioration. Thus, the temperature of the cylinder may be set to be low. A lower temperature of the cylinder results in a higher viscosity of the molding material and a lower flowability of the molding material. This tends to cause what is called short shot, which is a failure in which a portion of a molded product is missing. This failure is caused through solidification of the molding material before spreading over the interior of the mold part.

The short shot tends to occur when the molded product is thin. The thinner the molded product, the smaller the amount of the molding material used. Bioplastics are more expensive than petroleum-based plastics. Thus, there has been a desire to reduce the amount of the molding material used.

SUMMARY

A controller according to one aspect of the present disclosure is for an injection molding machine including an injecting member configured to push a molding material in a forward direction, the molding material containing a bioplastic; and an injection drive source configured to cause the injecting member to travel forward or backward. The controller is configured to perform filling in which a speed of the injecting member to travel forward (hereinafter may be referred to as "forward travel speed") is controlled so that an actual value of a pressure applied from the injecting member to the molding material does not exceed an upper limit of the pressure. In at least a part of the filling, a value of from 550 mm/s through 700 mm/s is settable as a set value of the forward travel speed of the injecting member, and a value of 200 MPa or higher is settable as the upper limit of the pressure.

DETAILED DESCRIPTION

Figure 1:
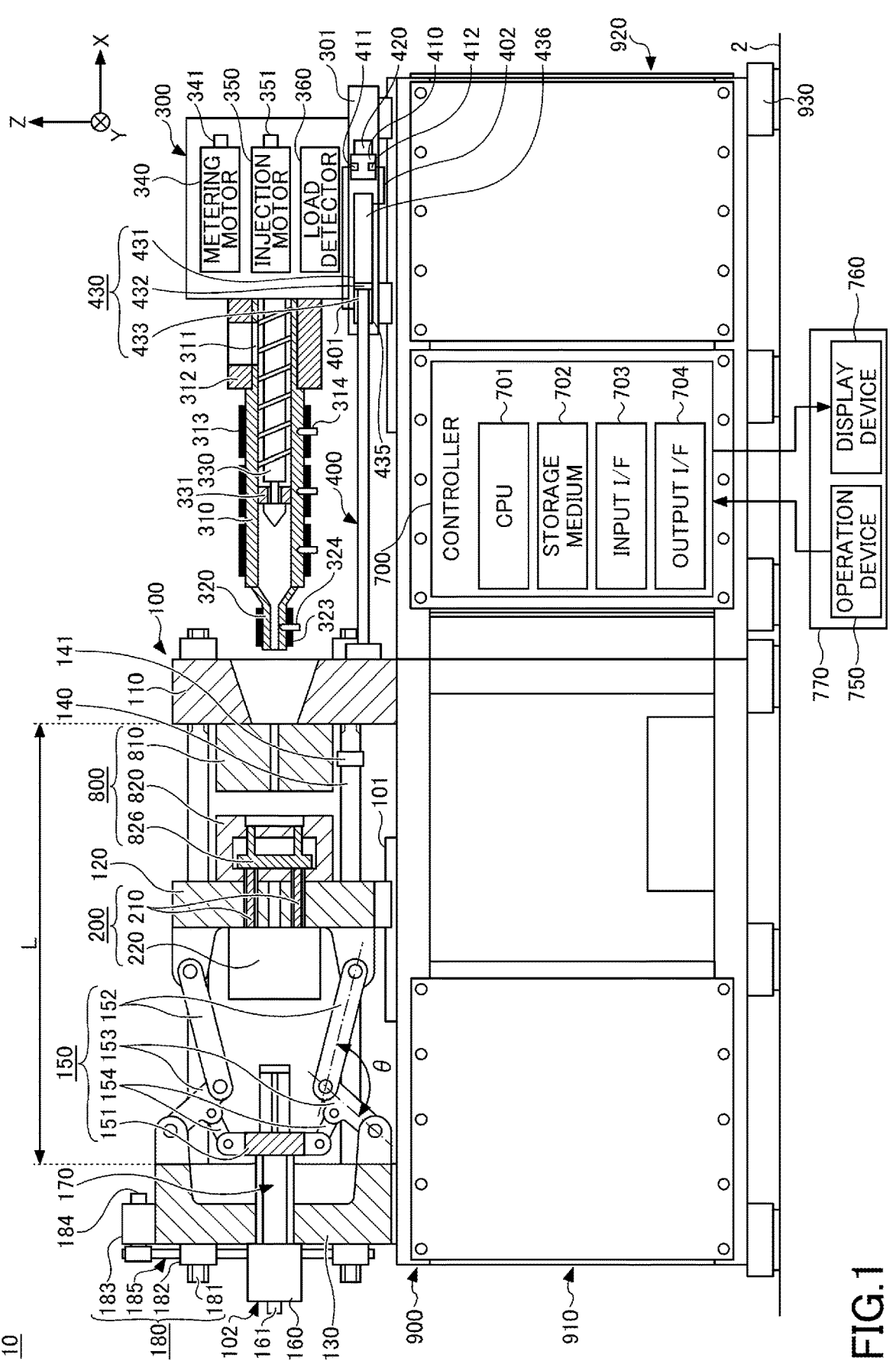
FIG. 1 is a diagram illustrating the state of an injection molding machine according to an embodiment at the completion of mold opening.

One aspect of the present disclosure provides a technique of suppressing molding failure when bioplastics are used.

Embodiments of the present disclosure will be described with reference to the drawings. In the drawings, the same or corresponding configurations are referred to using the same or corresponding symbols, and description thereof may be omitted.

(Injection Molding Machine)

Figure 2:
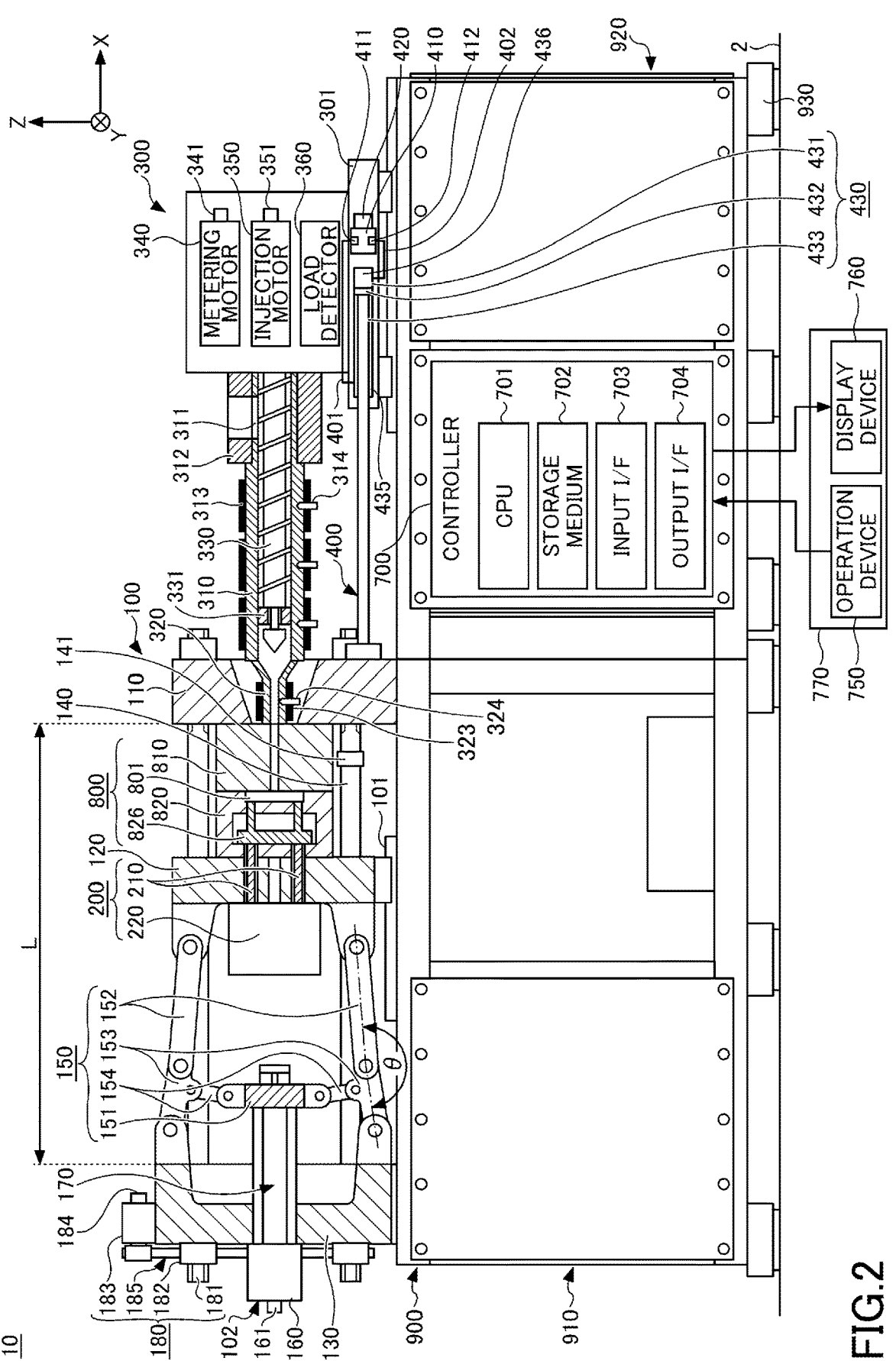
FIG. 2 is a diagram illustrating the state of the injection molding machine according to the embodiment during mold clamping.

FIG. 1 is a diagram illustrating the state of an injection molding machine according to an embodiment at the completion of mold opening. FIG. 2 is a diagram illustrating the state of the injection molding machine according to this embodiment during mold clamping. In this specification, the X-axis direction, the Y-axis direction, and the Z-axis direction are perpendicular to each other. The X-axis direction and the Y-axis direction represent horizontal directions, and the Z-axis direction represents a vertical direction. When a mold clamping part 100 is of a horizontal type, the X-axis direction is a mold opening/closing direction, and the Y-axis direction is a widthwise direction of an injection molding machine 10. The negative side in the Y-axis direction is referred to as "operation side", and the positive side in the Y-axis direction is referred to as "non-operation side."

As illustrated in FIG. 1 and FIG. 2, the injection molding machine 10 includes the mold clamping part 100 that opens and closes a mold part 800, an ejector 200 that ejects a molded product in the mold part 800, an injection part 300 that injects a molding material into the mold part 800, a movement part 400 that moves the injection part 300 toward and away from the mold part 800, a controller 700 (an example of processing circuitry) that controls the components of the injection molding machine 10, and a frame 900 that supports the components of the injection molding machine 10. The frame 900 includes a mold clamping part frame 910 that supports the mold clamping part 100 and an injection part frame 920 that supports the injection part 300. Each of the mold clamping part frame 910 and the injection part frame 920 is installed on a floor 2 via at least one leveling adjuster 930. The controller 700 is placed in the internal space of the injection part frame 920. Each component of the injection molding machine 10 is described below.

(Mold Clamping Part)

In the description of the mold clamping part 100, the direction of movement of a movable platen 120 during mold closing (e.g., the positive X-axis direction) is referred to as "forward direction", and the direction of movement of the movable platen 120 during mold opening (e.g., the negative X-axis direction) is referred to as "backward direction."

The mold clamping part 100 closes, pressurizes, clamps, depressurizes, and opens the mold part 800. The mold part 800 includes a stationary mold 810 and a movable mold 820.

The mold clamping part 100 is, for example, of a horizontal type, and the mold opening and closing directions are horizontal directions. The mold clamping part 100 includes a stationary platen 110 to which the stationary mold 810 is attached, the movable platen 120 to which the movable mold 820 is attached, and a movement mechanism 102 that moves the movable platen 120 in the mold opening and closing directions relative to the stationary platen 110.

The stationary platen 110 is fixed to the mold clamping part frame 910. The stationary mold 810 is attached to a surface of the stationary platen 110 that faces the movable platen 120.

The movable platen 120 is placed to be movable in the mold opening and closing directions relative to the mold clamping part frame 910. A guide 101 that guides the movable platen 120 is laid on the mold clamping part frame 910. The movable mold 820 is attached to a surface of the movable platen 120 that faces the stationary platen 110.

The movement mechanism 102 moves the movable platen 120 toward and away from the stationary platen 110 to close, pressurize, clamp, depressurize, and open the mold part 800. The movement mechanism 102 includes a toggle support 130 spaced apart from the stationary platen 110, a tie bar 140 connecting the stationary platen 110 and the toggle support 130, a toggle mechanism 150 that moves the movable platen 120 in the mold opening and closing directions relative to the toggle support 130, a mold clamping motor 160 that actuates the toggle mechanism 150, a motion conversion mechanism 170 that converts the rotational motion of the mold clamping motor 160 into linear motion, and a mold thickness adjustment mechanism 180 that adjusts the interval between the stationary platen 110 and the toggle support 130.

The toggle support 130 is spaced apart from the stationary platen 110 and is placed on the mold clamping part frame 910 to be movable in the mold opening and closing directions. The toggle support 130 may be placed to be movable along a guide laid on the mold clamping part frame 910. The guide 101 of the movable platen 120 may also serve as the guide of the toggle support 130.

According to this embodiment, the stationary platen 110 is fixed to the mold clamping part frame 910 and the toggle support 130 is placed to be movable in the mold opening and closing directions relative to the mold clamping part frame 910. However, the toggle support 130 may be fixed to the mold clamping part frame 910 and the stationary platen 110 may be placed to be movable in the mold opening and closing directions relative to the mold clamping part frame 910.

The tie bar 140 connects the stationary platen 110 and the toggle support 130 with an interval (distance) L therebetween in the mold opening and closing directions. Multiple (e.g., four) tie bars may be used as the tie bar 140. The multiple tie bars 140 are placed parallel to the mold opening and closing directions and extend according to a mold clamping force. At least one tie bar 140 among the multiple tie bars 140 may be provided with a tie bar strain detector 141 that detects the strain of the tie bar 140. The tie bar strain detector 141 transmits a signal indicating the detection result to the controller 700. The detection result of the tie bar strain detector 141 is used to detect the mold clamping force.

According to this embodiment, the tie bar strain detector 141 is used as a mold clamping force detector to detect a mold clamping force. The present disclosure, however, is not limited to this configuration. The mold clamping force detector is not limited to be of a strain gauge type and may be of a piezoelectric type, a capacitive type, a hydraulic type, an electromagnetic type, or the like, and its attachment position is not limited to the tie bar 140.

The toggle mechanism 150 is placed between the movable platen 120 and the toggle support 130, and moves the movable platen 120 in the mold opening and closing directions relative to the toggle support 130. The toggle mechanism 150 includes a crosshead 151 that moves in the mold opening and closing directions and a pair of link groups that are extended and contracted by the movement of the crosshead 151. Each link group includes a first link 152 and a second link 153 that are extendable and contractible when connected by a pin or the like. The first link 152 is pivotably attached to the movable platen 120 with a pin or the like. The second link 153 is pivotably attached to the toggle support 130 with a pin or the like. The second link 153 is attached to the crosshead 151 via a third link 154. The crosshead 151 is moved toward or away from the toggle support 130 to contract or extend the first link 152 and the second link 153 to move the movable platen 120 toward or away from the toggle support 130.

The configuration of the toggle mechanism 150 is not limited to the configuration illustrated in FIG. 1 and FIG. 2. For example, the number of nodes of each link group, which is five in FIG. 1 and FIG. 2, may be four, and one end of the third link 154 may be connected to the node of the first link 152 and the second link 153.

The mold clamping motor 160 is attached to the toggle support 130 to actuate the toggle mechanism 150. The mold clamping motor 160 moves the crosshead 151 toward or away from the toggle support 130 to contract or extend the first link 152 and the second link 153 to move the movable platen 120 toward or away from the toggle support 130. The mold clamping motor 160, which is directly connected to the motion conversion mechanism 170, may alternatively be connected to the motion conversion mechanism 170 via a belt or pulley.

The motion conversion mechanism 170 converts the rotational motion of the mold clamping motor 160 into the linear motion of the crosshead 151. The motion conversion mechanism 170 includes a screw shaft and a screw nut screwed to the screw shaft. Balls or rollers may be interposed between the screw shaft and the screw nut.

The mold clamping part 100 performs a mold closing process, a pressurizing process, a mold clamping process, a depressurizing process, a mold opening process, and the like under the control of the controller 700.

In the mold closing process, the mold clamping motor 160 is driven to move the crosshead 151 forward to a mold closing completion position at a set travel speed to move the movable platen 120 forward to cause the movable mold 820 to touch the stationary mold 810. The position and travel speed of the crosshead 151 are detected using a mold clamping motor encoder 161 or the like. The mold clamping motor encoder 161 detects the rotation of the mold clamping motor 160 and transmits a signal indicating the detection results to the controller 700.

A crosshead position detector that detects the position of the crosshead 151 and a crosshead travel speed detector that detects the travel speed of the crosshead 151 are not limited to the mold clamping motor encoder 161 and common ones may be employed. Furthermore, a movable platen position detector that detects the position of the movable platen 120 and a movable platen travel speed detector that detects the travel speed of the movable platen 120 are not limited to the mold clamping motor encoder 161 and common ones may be employed.

In the pressurizing process, the mold clamping motor 160 is further driven to further move the crosshead 151 from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (see FIG. 2) is formed between the movable mold 820 and the stationary mold 810, and the injection part 300 fills the cavity space 801 with a liquid molding material. The molding material is solidified, so that a molded product is obtained.

The number of cavity spaces 801 may be one or more. In the latter case, multiple molded products are simultaneously obtained. An insert material may be placed in part of the cavity space 801 and the molding material may fill another part of the cavity space 801. Thereby, a molded product into which the insert material and the molding material are integrated is obtained.

In the depressurizing process, the mold clamping motor 160 is driven to move the crosshead 151 backward from the mold clamping position to a mold opening start position to move the movable platen 120 backward to reduce the mold clamping force. The mold opening start position and the mold closing completion position may be the same position.

In the mold opening process, the mold clamping motor 160 is driven to move the crosshead 151 backward from the mold opening start position to a mold opening completion position at a set travel speed to move the movable platen 120 backward to separate the movable mold 820 from the stationary mold 810. Thereafter, the ejector 200 ejects the molded product from the movable mold 820.

Set conditions in the mold closing process, the pressurizing process, and the mold clamping process are collectively set as a series of set conditions. For example, the travel speed and positions (including a mold closing start position, a travel speed switch position, the mold closing completion position, and the mold clamping position) of the crosshead 151 and the mold clamping force in the mold closing process and the pressurizing process are collectively set as a series of set conditions. The mold closing start position, the travel speed switch position, the mold closing completion position, and the mold clamping position, which are arranged in this order in the forward direction from the back side, represent the start points and end points of sections for which the travel speed is set. The travel speed is set section by section. There may be one or more travel speed switch positions. The travel speed switch position may not be set. Only one of the mold clamping position and the mold clamping force may be set.

Setting conditions in the depressurizing process and the mold opening process are likewise set. For example, the travel speed and positions (the mold opening start position, the travel speed switch position, and the mold opening completion position) of the crosshead 151 in the depressurizing process and the mold opening process are collectively set as a series of set conditions. The mold opening start position, the travel speed switch position, and the mold opening completion position, which are arranged in this order in the backward direction from the front side, represent the start points and end points of sections for which the travel speed is set. The travel speed is set section by section. There may be one or more travel speed switch positions. The travel speed switch position may not be set. The mold opening start position and the mold closing completion position may be the same position. The mold opening completion position and the mold closing start position may be the same position.

Instead of the travel speed, position, and the like, of the crosshead 151, the travel speed, position, and the like, of the movable platen 120 may be set. Furthermore, instead of the crosshead position (e.g., the mold clamping position) or the movable platen position, the mold clamping force may be set.

The toggle mechanism 150 amplifies the driving force of the mold clamping motor 160 and transmits the amplified driving force to the movable platen 120. The amplification factor is also referred to as "toggle multiplying factor." The toggle multiplying factor changes according to the angle θ formed by the first link 152 and the second link 153 (hereinafter also referred to as "link angle θ"). The link angle θ is determined from the position of the crosshead 151. The toggle multiplying factor is maximized when the link angle θ is 180°.

When there is a change in the thickness of the mold part 800 because of the replacement of the mold part 800 or a change in the temperature of the mold part 800, the mold thickness is adjusted to obtain a predetermined mold clamping force at the time of mold clamping. In adjusting the mold thickness, for example, the interval L between the stationary platen 110 and the toggle support 130 is adjusted so that the link angle θ of the toggle mechanism 150 becomes a predetermined angle at the time of mold touch when the movable mold 820 touches the stationary mold 810.

The mold clamping part 100 includes the mold thickness adjustment mechanism 180. The mold thickness adjustment mechanism 180 adjusts the mold thickness by adjusting the interval L between the stationary platen 110 and the toggle support 130. The mold thickness is adjusted between the end of a molding cycle and the start of the next molding cycle, for example. The mold thickness adjustment mechanism 180 includes, for example, a threaded shaft 181 formed at the rear end of each tie bar 140, a threaded nut 182 held on the toggle support 130 in such a manner as to be rotatable and impossible to move forward or backward, and a mold thickness adjustment motor 183 that rotates the threaded nut 182 mating with the threaded shaft 181.

The threaded shaft 181 and the threaded nut 182 are provided for each tie bar 140. The rotational driving force of the mold thickness adjustment motor 183 may be transmitted to the multiple threaded nuts 182 via a rotational driving force transmission part 185. It is possible to synchronously rotate the multiple threaded nuts 182. The multiple threaded nuts 182 may be individually rotated by changing the transmission channel of the rotational driving force transmission part 185.

The rotational driving force transmission part 185 is constituted of, for example, gears. In such a case, a driven gear is formed at the periphery of each threaded nut 182, a drive gear is attached to the output shaft of the mold thickness adjustment motor 183, and an intermediate gear that meshes with the driven gears and the drive gear is rotatably held in the center of the toggle support 130. The rotational driving force transmission part 185 may be constituted of a belt and pulleys instead of gears.

The operation of the mold thickness adjustment mechanism 180 is controlled by the controller 700. The controller 700 drives the mold thickness adjustment motor 183 to rotate the threaded nuts 182. As a result, the position of the toggle support 130 relative to the tie bars 140 is adjusted, and the interval L between the stationary platen 110 and the toggle support 130 is adjusted. Multiple mold thickness adjustment mechanisms may be used in combination.

The interval L is detected using a mold thickness adjustment motor encoder 184. The mold thickness adjustment motor encoder 184 detects the amount of rotation and the direction of rotation of the mold thickness adjustment motor 183, and transmits a signal indicating the detection results to the controller 700. The detection results of the mold thickness adjustment motor encoder 184 are used to monitor and control the position of the toggle support 130 and the interval L. A toggle support position detector that detects the position of the toggle support 130 and an interval detector that detects the interval L are not limited to the mold thickness adjustment motor encoder 184 and common ones may be employed.

The mold clamping part 100 may include a mold temperature adjuster that adjusts the temperature of the mold part 800. The mold part 800 contains a flow path for a temperature adjust medium. The mold temperature adjuster adjusts the temperature of the mold part 800 by adjusting the temperature of the temperature adjust medium supplied to the flow path of the mold part 800.

The mold clamping part 100, which is of a horizontal type whose mold opening and closing directions are horizontal directions according to this embodiment, may also be of a vertical type whose mold opening and closing directions are vertical directions.

The mold clamping part 100, which includes the mold clamping motor 160 as a drive source according to this embodiment, may also include a hydraulic cylinder instead of the mold clamping motor 160. Furthermore, the mold clamping part 100 may include a linear motor for mold opening and closing and may include an electromagnet for mold clamping.

(Ejector)

In the description of the ejector 200, similar to the description of the mold clamping part 100, the direction of movement of the movable platen 120 during mold closing (e.g., the positive X-axis direction) is referred to as "forward direction", and the direction of movement of the movable platen 120 during mold opening (e.g., the negative X-axis direction) is referred to as "backward direction."

The ejector 200 is attached to the movable platen 120 and moves forward and backward together with the movable platen 120. The ejector 200 includes one or more ejector rods 210 that eject a molded product from the mold part 800 and a drive mechanism 220 that moves the ejector rod 210 in the directions of movement (the X-axis direction) of the movable platen 120.

Each ejector rod 210 is placed in a through hole of the movable platen 120 to be movable forward and backward. The front end of the ejector rod 210 contacts an ejector plate 826 of the movable mold 820. The front end of the ejector rod 210 may be connected to or disconnected from the ejector plate 826.

The drive mechanism 220 includes, for example, an ejector motor and a motion conversion mechanism that converts the rotational motion of the ejector motor into the linear motion of the ejector rod 210. The motion conversion mechanism includes a threaded shaft and a threaded nut that mates with the threaded shaft. Balls or rollers may be interposed between the threaded shaft and the threaded nut.

The ejector 200 executes an ejection process under the control of the controller 700. In the ejection process, the ejector rods 210 are moved forward from a standby position to an ejection position at a set travel speed to move the ejector plate 826 forward to eject a molded product. Thereafter, the ejector motor is driven to move the ejector rods 210 backward at a set travel speed to move the ejector plate 826 backward to the initial standby position.

The position and travel speed of the ejector rods 210 are detected using an ejector motor encoder, for example. The ejector motor encoder detects the rotation of the ejector motor to transmit a signal indicating the detection results to the controller 700. An ejector rod position detector that detects the position of the ejector rods 210 and an ejector rod travel speed detector that detects the travel speed of the ejector rods 210 are not limited to the ejector motor encoder and common ones may be employed.

(Injection Part)

Unlike in the description of the mold clamping part 100 and the ejector 200, in the description of the injection part 300, the direction of movement of a screw 330 during filling (e.g., the negative X-axis direction) is referred to as "forward direction", and the direction of movement of the screw 330 during metering (e.g., the positive X-axis direction) is referred to as "backward direction."

The injection part 300 is installed on a slidable base 301, and the slidable base 301 is so placed as to be movable forward and backward relative to the injection part frame 920. The injection part 300 is so placed as to be movable toward and away from the mold part 800. The injection part 300 touches the mold part 800 to fill the cavity space 801 within the mold part 800 with a molding material. The injection part 300 includes, for example, a cylinder 310 that heats a molding material, a nozzle 320 provided at the front end of the cylinder 310, the screw 330 so placed in the cylinder 310 as to be movable forward and backward and rotatable, a metering motor 340 that rotates the screw 330, an injection motor 350 that moves the screw 330 forward and backward, and a load detector 360 that detects a load transmitted between the injection motor 350 and the screw 330.

The cylinder 310 heats a molding material supplied to the inside through a supply port 311. Examples of the molding material include resin. The molding material is formed into pellets, for example, and is supplied to the supply port 311 in a solid state. The supply port 311 is formed in a rear portion of the cylinder 310. A cooler 312 such as a water-cooled cylinder is provided on the outer cylindrical surface of the rear portion of the cylinder 310. First heaters 313 such as a band heater and first temperature detectors 314 are provided forward of the cooler 312 on the outer cylindrical surface of the cylinder 310.

The cylinder 310 is divided into multiple zones in the axial direction (e.g., the X-axis direction) of the cylinder 310. Each zone is provided with the first heater 313 and the first temperature detector 314. A temperature is set for each zone and the controller 700 controls the first heater 313 so that the temperature detected by the first temperature detector 314 becomes the set temperature.

The nozzle 320 is provided at the front end of the cylinder 310 to be pressed against the mold part 800. A second heater 323 and a second temperature detector 324 are provided at the periphery of the nozzle 320. The controller 700 controls the second heater 323 so that the detected temperature of the nozzle 320 becomes the set temperature.

The screw 330 is placed in the cylinder 310 to be rotatable and movable forward and backward. When the screw 330 rotates, a molding material is fed forward along the helical groove of the screw 330. The molding material is gradually melted by heat from the cylinder 310 as the molding material is fed forward. As the molding material in liquid form is fed forward on the screw 330 to be accumulated in the front of the cylinder 310, the screw 330 is moved backward. Thereafter, when the screw 330 is moved forward, the molding material in liquid form accumulated in front of the screw 330 is injected into the mold part 800 through the nozzle 320.

A backflow prevention ring 331 is so attached to a front portion of the screw 330 as to be movable forward and backward as a backflow check valve that prevents the backflow of the molding material from the front to the back of the screw 330 when the screw 330 is pushed forward.

When the screw 330 is moved forward, the backflow prevention ring 331 is pushed backward by the pressure of the molding material in front of the screw 330 to move backward relative to the screw 330 to a closing position (see FIG. 2) that closes the flow channel of the molding material, thereby preventing the backflow of the molding material accumulated in front of the screw 330 in the backward direction.

When the screw 330 is rotated, the backflow prevention ring 331 is pushed forward by the pressure of the molding material fed forward along the helical groove of the screw 330 to move forward relative to the screw 330 to an open position (see FIG. 1) that opens the flow channel of the molding material. As a result, the molding material is fed forward of the screw 330.

The backflow prevention ring 331 may be of a co-rotating type that rotates together with the screw 330 or of a non-co-rotating type that does not rotate together with the screw 330.

The injection part 300 may include a drive source that moves the backflow prevention ring 331 forward and backward between the open position and the closing position relative to the screw 330.

The metering motor 340 rotates the screw 330. The drive source that rotates the screw 330 is not limited to the metering motor 340 and may be, for example, a hydraulic pump.

The injection motor 350 moves the screw 330 forward and backward. A motion conversion mechanism that converts the rotational motion of the injection motor 350 into the linear motion of the screw 330, and the like, are provided between the injection motor 350 and the screw 330. The motion conversion mechanism includes, for example, a threaded shaft and a threaded nut that mates with the threaded shaft. Balls or rollers may be provided between the threaded shaft and the threaded nut. The drive source that moves the screw 330 forward and backward is not limited to the injection motor 350, and may be, for example, a hydraulic cylinder.

The load detector 360 detects a load transmitted between the injection motor 350 and the screw 330. The detected load is converted into pressure in the controller 700. The load detector 360 is provided in the load transmission path between the injection motor 350 and the screw 330 to detect a load applied to the load detector 360.

The load detector 360 transmits a signal of the detected load to the controller 700. The load detected by the load detector 360 is converted into a pressure applied between the screw 330 and the molding material, and is used to control and monitor a pressure that the screw 330 receives from the molding material, a back pressure against the screw 330, a pressure applied from the screw 330 to the molding material, and the like.

A pressure detector that detects the pressure of a molding material is not limited to the load detector 360 and a common one may be employed. For example, a nozzle pressure sensor or a cavity pressure sensor may be employed. The nozzle pressure sensor is placed in the nozzle 320. The cavity pressure sensor is placed within the mold part 800.

The injection part 300 executes processes such as a metering process, a filling process, and a dwelling process under the control of the controller 700. The filling process and the dwelling process may be collectively referred to as "injection process."

In the metering process, the metering motor 340 is driven to rotate the screw 330 at a set rotational speed to feed a molding material forward along the helical groove of the screw 330. With this, the molding material is gradually melted. As the molding material in liquid form is fed forward of the screw 330 to be accumulated in the front portion of the cylinder 310, the screw 330 is moved backward. The rotational speed of the screw 330 is detected using a metering motor encoder 341 or the like. The metering motor encoder 341 detects the rotation of the metering motor 340 and transmits a signal indicating the detection results to the controller 700. A screw rotational speed detector that detects the rotational speed of the screw 330 is not limited to the metering motor encoder 341 and a common one may be employed.

In the metering process, in order to restrict a sudden backward movement of the screw 330, the injection motor 350 may be driven to apply a set back pressure to the screw 330. The back pressure to the screw 330 is detected using the load detector 360, for example. When the screw 330 is moved backward to a metering completion position and a predetermined amount of molding material is accumulated in front of the screw 330, the metering process is completed.

The position and rotational speed of the screw 330 in the metering process are collectively set as a series of set conditions. For example, a metering start position, a rotational speed switch position, and the metering completion position are set. These positions, which are arranged in this order in the backward direction from the front side, represent the start points and end points of sections for which the rotational speed is set. The rotational speed is set section by section. There may be one or more rotational speed switch positions. The rotational speed switch position may not be set. Furthermore, a back pressure is set for each section.

In the filling process, the injection motor 350 is driven to move the screw 330 forward at a set travel speed to fill the cavity space 801 within the mold part 800 with the molding material in liquid form accumulated in front of the screw 330. The position and travel speed of the screw 330 are detected using an injection motor encoder 351, for example. The injection motor encoder 351 detects the rotation of the injection motor 350 and transmits a signal indicating the detection results to the controller 700. When the position of the screw 330 reaches a set position, the filling process switches to the dwelling process (so-called V/P switchover). The position at which V/P switchover occurs may be referred to as "V/P switchover position." The set travel speed of the screw 330 may be changed according to the position of the screw 330, time, and the like.

The position and travel speed of the screw 330 in the filling process are collectively set as a series of set conditions. For example, a filling start position (also referred to as "injection start position"), a travel speed switch position, and the V/P switchover position are set. These positions, which are arranged in this order in the forward direction from the back side, represent the start points and end points of sections for which the travel speed is set. The travel speed is set section by section. There may be one or more travel speed switch positions. The travel speed switch position may not be set.

The upper limit of the pressure of the screw 330 is set for each section for which the travel speed of the screw 330 is set. The pressure of the screw 330 is detected by the load detector 360. When the pressure of the screw 330 is less than or equal to a set pressure, the screw 330 is moved forward at a set travel speed. When the pressure of the screw 330 exceeds the set pressure, the screw 330 is moved forward at a travel speed lower than the set travel speed so that the pressure of the screw 330 is less than or equal to the set pressure, for mold protection.

In the filling process, after the position of the screw 330 reaches the V/P switchover position, the screw 330 may be temporarily stopped at the V/P switchover position and the V/P switchover may be thereafter performed. Immediately before the V/P switchover, the screw 330 may be moved forward or backward very slowly instead of being stopped. A screw position detector that detects the position of the screw 330 and a screw travel speed detector that detects the travel speed of the screw 330 are not limited to the injection motor encoder 351 and common ones may be employed.

In the dwelling process, the injection motor 350 is driven to push the screw 330 forward to hold the pressure of the molding material at the front end of the screw 330 (hereinafter also referred to as "dwell pressure") at a set pressure and press the molding material remaining in the cylinder 310 toward the mold part 800. It is possible to compensate for a shortage of molding material due to cooling contracture within the mold part 800. The dwell pressure is detected using the load detector 360, for example. The set value of the dwell pressure may be changed according to elapsed time from the start of the dwelling process or the like. Two or more values may be set for each of the dwell pressure and the dwell time for holding the dwell pressure in the dwelling process, and the dwell pressure and the dwell time may be collectively set as a series of set conditions.

In the dwelling process, the molding material in the cavity space 801 within the mold part 800 is gradually cooled, so that the entrance of the cavity space 801 is filled up with the solidified molding material when the dwelling process is completed. This state, which is referred to as "gate seal," prevents the backflow of the molding material from the cavity space 801. After the dwelling process, a cooling process is started. In the cooling process, the molding material in the cavity space 801 is solidified. The metering process may be executed during the cooling process in order to reduce molding cycle time.

The injection part 300, which is of an in-line screw type according to this embodiment, may be of a screw pre-plasticizing type. According to the screw pre-plasticizing injection part, a molding material melted in a plasticizing cylinder is supplied to an injection cylinder, and the molding material is injected into a mold part from the injection cylinder. In the plasticizing cylinder, a screw is so placed as to be rotatable and immovable forward or backward or a screw is so placed as to be rotatable and movable forward and backward. In the injection cylinder, a plunger is so placed as to be movable forward and backward.

Furthermore, the injection part 300, which is of a horizontal type where the axial direction of the cylinder 310 is a horizontal direction according to this embodiment, may be of a vertical type where the axial direction of the cylinder 310 is a vertical direction. A mold clamping part combined with the injection part 300 of a vertical type may be of a horizontal type or a vertical type. Likewise, a mold clamping part combined with the injection part 300 of a horizontal type may be of a horizontal type or a vertical type.
(Moving Part)

In the description of the movement part 400, similar to the description of the injection part 300, the direction of movement of the screw 330 during filling (e.g., the negative X-axis direction) is referred to as "forward direction", and the direction of movement of the screw 330 during metering (e.g., the positive X-axis direction) is referred to as "backward direction."

The movement part 400 moves the injection part 300 toward and away from the mold part 800. Furthermore, the movement part 400 presses the nozzle 320 against the mold part 800 to generate a nozzle touch pressure. The movement part 400 includes a hydraulic pump 410, a motor 420 serving as a drive source, and a hydraulic cylinder 430 serving as a hydraulic actuator.

The hydraulic pump 410 includes a first port 411 and a second port 412. The hydraulic pump 410, which is a bidirectionally rotatable pump, switches the rotational direction of the motor 420 to take in hydraulic fluid (e.g., oil) from one of the first port 411 and the second port 412 and discharge hydraulic fluid from the other of the first port 411 and the second port 412, thereby generating hydraulic pressure. The hydraulic pump 410 may take in hydraulic fluid from a tank and discharge hydraulic fluid from one of the first port 411 and the second port 412.

The motor 420 causes the hydraulic pump 410 to operate. The motor 420 drives the hydraulic pump 410 with a rotational direction and a rotation torque corresponding to a control signal from the controller 700. The motor 420 may be an electric motor and may be an electric servo motor.

The hydraulic cylinder 430 includes a cylinder body 431, a piston 432, and a piston rod 433. The cylinder body 431 is fixed to the injection part 300. The piston 432 separates the inside of the cylinder body 431 into a front chamber 435 serving as a first chamber and a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow channel 401. Hydraulic fluid discharged from the first port 411 is supplied to the front chamber 435 via the first flow channel 401 to push the injection part 300 forward. The injection part 300 is moved forward to press the nozzle 320 against the stationary mold 810. The front chamber 435 serves as a pressure chamber that generates the nozzle touch pressure of the nozzle 320 with the pressure of the hydraulic fluid supplied from the hydraulic pump 410.

The rear chamber 436 of the hydraulic cylinder 430 is connected to the second port 412 of the hydraulic pump 410 via a second flow channel 402. Hydraulic fluid discharged from the second port 412 is supplied to the rear chamber 436 of the hydraulic cylinder 430 via the second flow channel 402 to push the injection part 300 backward. The injection part 300 is moved backward to separate the nozzle 320 from the stationary mold 810.

According to this embodiment, the movement part 400 includes the hydraulic cylinder 430. The present disclosure, however, is not limited to this. For example, instead of the hydraulic cylinder 430, an electric motor and a motion conversion mechanism that converts the rotational motion of the electric motor into the linear motion of the injection part 300 may be employed.

(Controller)

The controller 700, which is composed of, for example, a computer, includes a central processing unit (CPU) 701, a storage medium 702 such as a memory, an input interface (I/F) 703, and an output interface (I/F) 704 as illustrated in FIG. 1 and FIG. 2. The controller 700 executes various controls by causing the CPU 701 to execute one or more programs stored in the storage medium 702. Furthermore, the controller 700 receives an external signal at the input interface 703 and transmits a signal to the outside at the output interface 704.

The controller 700 repeatedly produces a molded product by repeatedly executing processes such as the metering process, the mold closing process, the pressurizing process, the mold clamping process, the filling process, the dwelling process, the cooling process, the depressurizing process, the mold opening process, and the ejection process. A series of operations for obtaining a molded product, for example, operations from the start of a metering process and the start of the next metering process, may be referred to as "shot" or "molding cycle." Furthermore, time required for one shot may be referred to as "molding cycle time" or "cycle time."

One molding cycle has, for example, the metering process, the mold closing process, the pressurizing process, the mold clamping process, the filling process, the dwelling process, the cooling process, the depressurizing process, the mold opening process, and the ejection process in this order. The order here is order in which the processes are started. The filling process, the dwelling process, and the cooling process are executed during the mold clamping process. The start of the mold clamping process may coincide with the start of the filling process. The completion of the depressurizing process coincides with the start of the mold opening process.

Multiple processes may be simultaneously executed to reduce the molding cycle time. For example, the metering process may be executed during the cooling process of the previous molding cycle or may be executed during the mold clamping process. In such a case, the mold closing process may be executed at the beginning of the molding cycle. Furthermore, the filling process may be started during the mold closing process. Furthermore, the ejection process may be started during the mold opening process. When an on-off valve that opens and closes the flow path of the nozzle 320 is provided, the mold opening process may be started during the metering process. This is because even when the mold opening process is started during the metering process, no molding material leaks from the nozzle 320 as long as the on-off valve closes the flow path of the nozzle 320.

One molding cycle may include one or more processes other than the metering process, the mold closing process, the pressurizing process, the mold clamping process, the filling process, the dwelling process, the cooling process, the depressurizing process, the mold opening process, and the ejection process.

For example, before the start of the metering process after the completion of the dwelling process, a pre-metering suck back process to move the screw 330 backward to a preset metering start position may be executed. This makes it possible to reduce the pressure of the molding material accumulated in front of the screw 330 before the start of the metering process and to prevent a sudden backward movement of the screw 330 at the start of the metering process.

Furthermore, before the start of the filling process after the completion of the metering process, a post-metering suck back process to move the screw 330 backward to a preset filling start position (also referred to as "injection start position") may be executed. This makes it possible to reduce the pressure of the molding material accumulated in front of the screw 330 before the start of the filling process and to prevent the leakage of the molding material from the nozzle 320 before the start of the filling process.

The controller 700 is connected to an operation device 750 that receives an input operation from a user and a display device 760 that displays a screen. The operation device 750 and the display device 760 may be composed of, for example, a touchscreen 770 as a one-piece structure. The touchscreen 770 serving as the display device 760 displays a screen under the control of the controller 700. For example, information such as the settings of the injection molding machine 10 and the current condition of the injection molding machine 10 may be displayed on the screen of the touchscreen 770. For example, operation parts such as buttons and input fields for receiving a user's input operation may be displayed on the screen of the touchscreen 770. The touchscreen 770 serving as the operation device 750 detects a user's input operation on the screen and outputs a signal according to the input operation to the controller 700. This enables the user to, for example, enter the settings (including setting values) for the injection molding machine 10 by operating the operation parts provided on the screen while checking information displayed on the screen. Furthermore, by operating the operation parts provided on the screen, the user can cause the injection molding machine 10 to perform operations corresponding to the operation parts. The operations of the injection molding machine 10 may be, for example, the operations (including stopping) of the mold clamping part 100, the ejector 200, the injection part 300, the movement part 400, and the like. Furthermore, the operations of the injection molding machine 10 may be, for example, the switching of the screen displayed on the touchscreen 770 serving as the display device 760.

The operation device 750 and the display device 760 of this embodiment, which are described as being integrated into the touchscreen 770, may be separately provided. Furthermore, two or more operation devices 750 may be provided. The operation device 750 and the display device 760 are disposed on the operation side (the negative side in the Y-axis direction) of the mold clamping part 100 (more specifically, the stationary platen 110).

(Details of Controller)

Figure 3:
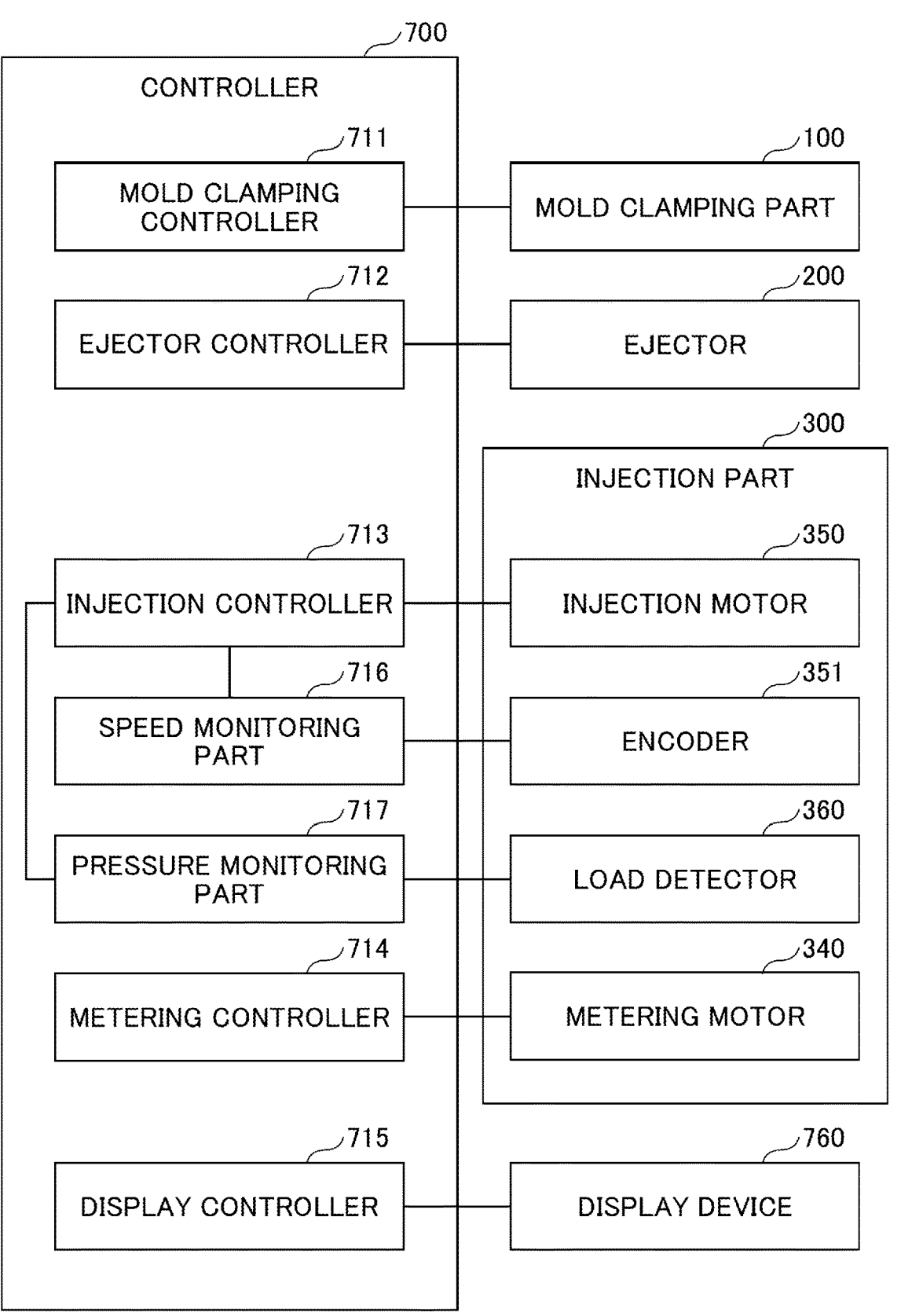
FIG. 3 is a diagram illustrating a functional block of an example of components of a controller.

Next, an example of the components of the controller 700 will be described with reference to FIG. 3. The functional blocks illustrated in FIG. 3 are conceptual and do not have to be physically configured as illustrated. All or some of the functional blocks may be functionally or physically distributed or integrated in desired parts. Processing functions executed in the functional blocks are entirely or partly as desired executed by one or more programs executed in a CPU. Alternatively, the functional blocks may be realized as hardware by wired logic.

As illustrated in FIG. 3, the controller 700 includes, for example, a mold clamping controller 711, an ejector controller 712, an injection controller 713, a metering controller 714, and a display controller 715. The mold clamping controller 711 is configured to control the mold clamping part 100, and perform the mold closing process, the pressurizing process, the mold clamping process, the depressurizing process, and the mold opening process illustrated in FIG. 4. The ejector controller 712 is configured to control the ejector 200, and perform the ejection process. The injection controller 713 is configured to control an injection drive source of the injection part 300, and perform the injection process. The injection drive source is, for example, the injection motor 350, but may be a hydraulic cylinder or the like. The metering controller 714 is configured to control a metering drive source of the injection part 300, and perform the metering process. The metering drive source is, for example, the metering motor 340, but may be a hydraulic pump or the like. The metering process is performed during the cooling process. The display controller 715 is configured to control the display device 760.

Figure 4:
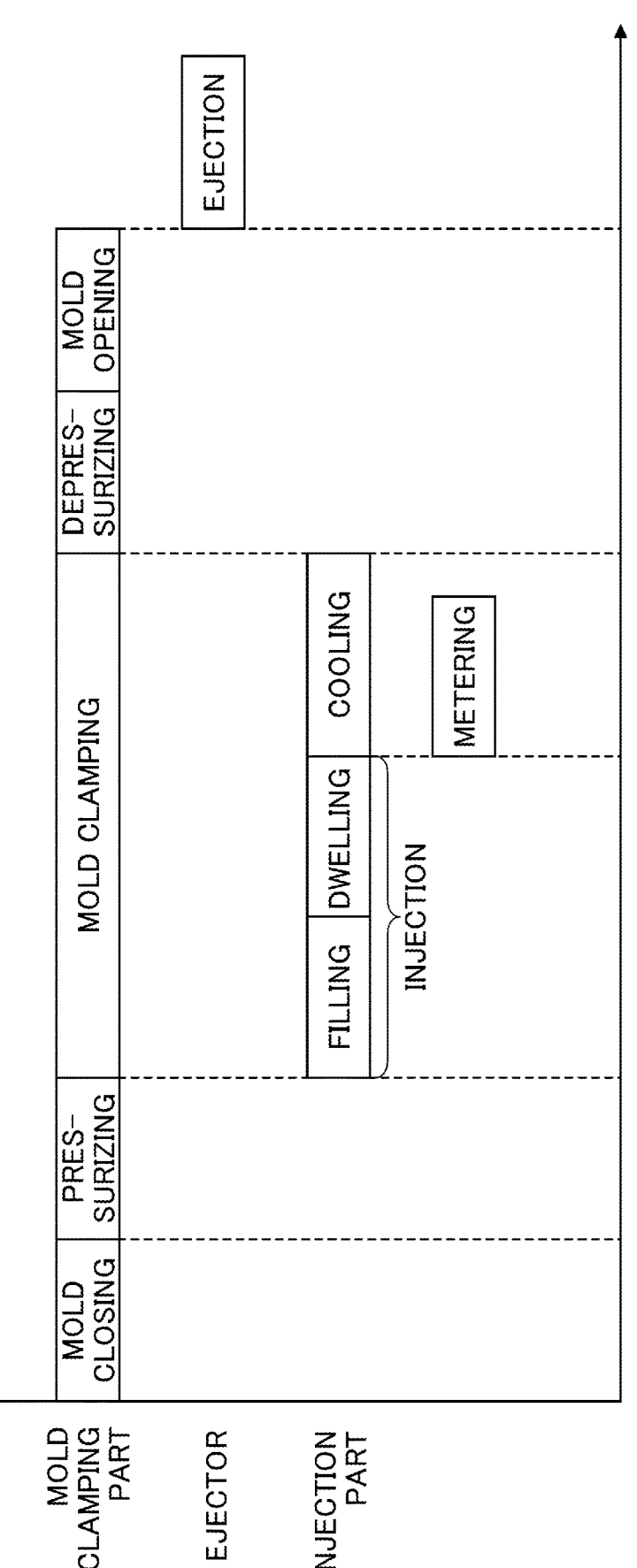
FIG. 4 is an example of a molding cycle process.

As illustrated in FIG. 4, the injection process includes the filling process and the dwelling process in this order. The injection process is performed during the clamping process. In the injection process, a speed monitoring part 716 monitors an actual value of a travel speed of the injecting member. The injecting member is a member configured to push the molding material. The molding material contains resin. The injecting member is, for example, the screw 330, but may be a plunger. The travel speed of the injecting member is detected using a speed detector. The speed detector is, for example, the injection motor encoder 351. In the injection process, a pressure monitoring part 717 monitors an actual value of a pressure applied from the injecting member to the molding material. The pressure is detected using a pressure detector such as the load detector 360 or the like. The pressure detector may be a nozzle pressure sensor or a cavity pressure sensor.

In the filling process, by causing the injecting member to travel forward, the mold part 800 is filled with the molding material in liquid form accumulated in the front of the injecting member. In the filling process, for example, the injection drive source is controlled so that an actual value of the travel speed of the injecting member provided in the cylinder 310 becomes a set value. In the filling process, in response to the injecting member traveling forward, the actual value of the pressure applied from the injecting member to the molding material increases.

In the dwelling process, by pushing the injecting member forward, a shortage of molding material due to cooling contracture within the mold part 800 is compensated for. In the dwelling process, for example, the injection drive source is controlled so that an actual value of the pressure applied from the injecting member to the molding material becomes a set value.

Next, an example of a screen 761 in relation to settings of the injection process will be described with reference to FIG. 5. The screen 761 includes input parts 762 to 767 in relation to settings of the injection process. The user inputs settings to the input parts 762 to 767 by operating the operation device 750 (see FIG. 1 and FIG. 2) while checking the screen 761. The input parts 762 to 767 display the settings input to the input parts 762 to 767 as numbers, characters, or symbols. The symbols include graphical symbols.

First, settings of the filling process will be described. The settings of the filling process are input to the input parts 762, 763, and 764. Set values L1 to L5 of a position of the injecting member are input to the input parts 762. The position is, for example, expressed as a distance from the position of the mechanical limit of a forward movement of the injecting member. Set values V1 to V5 of the travel speed of the injecting member are input to the input parts 763. A set value P0 of a pressure applied from the injecting member to the molding material is input to the input part 764. P0 is the upper limit.

In the filling process, the injection controller 713 feedback-controls the injection drive source so that the actual value of the travel speed of the injecting member becomes a set value (e.g., V1) until the actual value of the position of the injecting member reaches a set value (e.g., L1). The injection controller 713 may correct, for example, the set value of the travel speed so that the actual value of the pressure applied from the injecting member to the molding material does not exceed the set value PG.

In order to enable setting the combination of the position and the travel speed in the filling process at, for example, up to five steps, five sets of the vertically aligned pair of input parts 762 and 763 are laterally aligned, for example. Set values L1 to L4 of the travel speed switch position are input to four of the input parts 762. A set value L5 of the V/P switchover position is input to the remaining input part 762. Set values V1 to V5 of the travel speed are input to the five input parts 763. The number of the sets of the input parts 762 and 763 is not limited to five.

When the number of the sets of the input parts 762 and 763 is five, not all of the five sets of the input parts 762 and 763 may be used. To the input parts 762 and 763 that are not used, characters expressing being not used, such as "OFF" or the like, are input. Being not used may be expressed with symbols or blanks rather than the characters.

From the beginning of the filling process to the end of the filling process, the travel speed of the injecting member may not be switched, and the travel speed of the injecting member may be constant. In this case, only the combination of the set value L5 of the V/P switchover position and the set value V5 of the travel speed until the V/P switchover position may be input. When the actual value of the position of the injecting member has reached the set value L5 of the V/P switchover position, the injection controller 713 performs switching from the filling process to the dwelling process.

Next, settings of the dwelling process will be described. The settings of the dwelling process are input to input parts 765, 766, and 767. Set values T1 to T4 of the dwell time for holding the pressure applied from the injecting member to the molding material are input to the input parts 765. Set values P1 to P4 of the pressure applied from the injecting member to the molding material are input to the input parts 766. A set value V0 of the travel speed of the injecting member is input to the input part 767. V0 is the upper limit.

In the dwelling process, the injection controller 713 feedback-controls the injection drive source so that the actual value of the pressure becomes a set value (e.g., P1) until the actual value of the dwell time reaches a set value (e.g., T1). The injection controller 713 may correct, for example, the set value of the pressure so that the travel speed (forward or backward travel speed) of the injecting member does not exceed the set value V0. The input part 767 to which the set value of the forward travel speed is input and the input part 767 to which the set value of the backward travel speed is input may be separately provided.

In order to enable setting the combination of the dwell time and the pressure in the dwelling process at, for example, up to four steps, four sets of the vertically aligned pair of input parts 765 and 766 are laterally aligned, for example. The number of the sets of the input parts 765 and 766 is not limited to four. When the number of the sets of the input parts 765 and 766 is four, not all of the four sets of the input parts 765 and 766 may be used. From the beginning of the dwelling process to the end of the dwelling process, the pressure may not be switched, and the pressure may be constant. In this case, only one set of the combinations of the set value of the pressure and the set value of the dwell time may be input.

In recent years, bioplastics have been considered as the molding material for injection molding. Bioplastics are a generic term of biomass plastics and biodegradable plastics. Biomass plastics are plastics whose raw materials are biological resources such as plants. Biodegradable plastics are plastics that are eventually degraded to carbon dioxide and water by the action of microorganisms. An example of the bioplastics for injection molding is, for example, polylactic acid (PLA). PLA is both a biomass plastic and a biodegradable plastic.

Bioplastics tend to involve thermal deterioration. Thus, the temperature of the cylinder 310 may be set to be low. A lower temperature of the cylinder 310 results in a higher viscosity of the molding material and a lower flowability of the molding material. This tends to cause what is called short shot, which is a failure in which a portion a molded product is missing. This failure is caused through solidification of the molding material before spreading over the interior of the mold part 800.

The short shot tends to occur when the molded product is thin. The thinner the molded product, the smaller the amount of the molding material used. Bioplastics are more expensive than petroleum-based plastics. Thus, there has been a desire to reduce the amount of the molding material used. The thickness of at least a part of the molded product is preferably 1.0 mm or smaller, more preferably 0.8 mm or smaller, and further preferably 0.6 mm or smaller. The thickness of the molded product may be 0.1 mm or larger.

Figure 6:
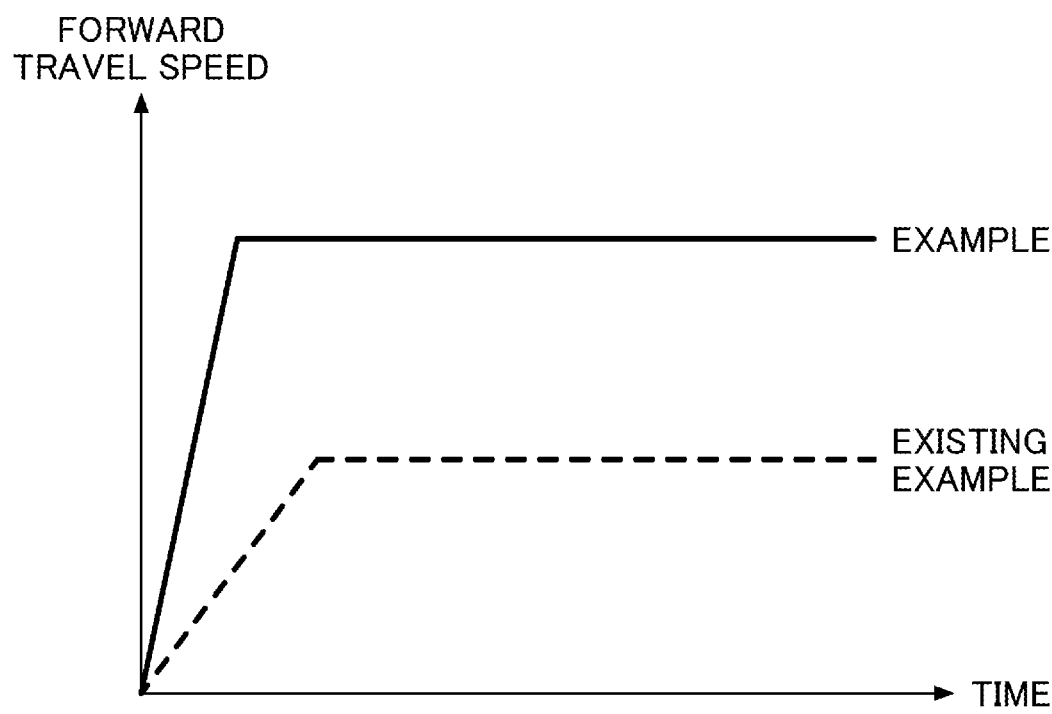
FIG. 6 is a graph illustrating an example of change over time in a forward travel speed of a screw.

In order to suppress the short shot, the injection controller 713 of this embodiment causes the screw 330 to travel forward at a high speed as indicated by a solid line in FIG. 6, and fills the mold part 800 with the molding material in a short time. In at least a part of the filling process, a value of from 550 mm/s through 700 mm/s is settable as the set value of the forward travel speed of the screw 330, and a value of 200 MPa or higher is settable as the upper limit P0 of the pressure.

As described below, if the forward travel speed of the screw 330 and the upper limit P0 of the pressure can be set to be high, it is considered that there may be a risk of, for example, breakage of the mold part 800. Thus, inputting or setting of a high numerical value is usually restricted. Meanwhile, when the molding material containing bioplastics is used, the forward travel speed of the screw 330 and the upper limit P0 of the pressure are preferably set to be higher than in a case of using resin. In an apparatus using the molding material containing bioplastics, inputting or setting of a high numerical value is preferably possible.

In order to fill the mold part 800 with the molding material in a short time, preferably, the injection controller 713 does not perform switching of the set value of the forward travel speed of the screw 330 from the beginning of the filling process to the end of the filling process. Therefore, throughout the filling process, preferably, a value of from 550 mm/s through 700 mm/s is input as the set value of the forward travel speed of the screw 330 and a value of 200 MPa or higher is input as the upper limit P0 of the pressure.

When the set value of the forward travel speed of the screw 330 is 550 mm/s or higher, the mold part 800 can be filled with the molding material in a short time, and the short shot can be suppressed. The set value of the forward travel speed of the screw 330 is preferably 600 mm/s or higher and more preferably 650 mm/s or higher. The higher the set value of the forward travel speed of the screw 330, the more preferable. However, the set value thereof may be 700 mm/s or lower in terms of capacity of the injection motor 350.

In addition to the set value of the forward travel speed of the screw 330, the upper limit P0 of the pressure is set to be 200 MPa or higher so that the actual value of the forward travel speed of the screw 330 becomes 550 mm/s or higher. When the upper limit P0 of the pressure is lower than 200 MPa, even if the set value of the forward travel speed of the screw 330 is 550 mm/s or higher, the actual value of the pressure reaches the upper limit P0 before the actual value of the forward travel speed of the screw 330 reaches 550 mm/s. The upper limit P0 of the pressure is preferably higher. However, the upper limit P0 of the pressure is preferably 300 MPa or lower in terms of capacity of the injection motor 350.

Next, experimental data will be described with reference to Table 1. Injection molding was performed under the same conditions except for the conditions shown in Table 1 (the set value of the forward travel speed of the screw 330, and the upper limit P0 of the pressure), thereby studying the presence or absence of molding failure (short shot). The set value of the forward travel speed of the screw 330, and the upper limit P0 of the pressure were constant from the beginning of the filling process to the end of the filling process.

TABLE 1

| | | Upper limit of pressure [MPa] | | | |
|---|---|---|---|---|---|
| | | 190 | 200 | 205 | 210 |
| Set value of forward | 500 | B | B | B | B |
| travel speed | 550 | B | A | A | A |
| [mm/s] | 600 | B | A | A | A |
| | 650 | B | A | A | A |

In Table 1, "A" means the absence of molding failure, and "B" means the presence of molding failure. Note that, main b conditions except for the conditions shown in Table 1 were as follows.

Injection molding machine: SE280HSZ Packaging spec., as a product name, obtained from Sumitomo Heavy Industries, Ltd.

Diameter of the screw: 56 mm

Molded product: cup-shaped transparent container (opening diameter: 86 mm, height: 55 mm, thickness: 0.4 mm)

Number of molded products per shot: eight

Molding material: PlaX (polylactic acid), as a product name, obtained from Bioworks Corporation As shown in Table 1, no occurrence of molding failure (short shot) was achievable when the set value of the forward travel speed of the screw 330 was from 550 mm/s through 700 mm/s and the upper limit P0 of the pressure was 200 MPa or higher. When the upper limit P0 of the pressure was 200 MPa or higher, the actual value of the forward travel speed of the screw 330 matched the set value.

Meanwhile, when the upper limit P0 of the pressure was 190 MPa, the actual value of the pressure reached the upper limit P0 before the actual value of the forward travel speed of the screw 330 reached 550 mm/s. As a result, the actual value of the forward travel speed of the screw 330 did not become 550 mm/s or higher, causing molding failure.

The other conditions (e.g., the temperature of the cylinder 310 and the like) than the conditions shown in Table 1 (the set value of the forward travel speed of the screw 330, and the upper limit P0 of the pressure) were previously optimized. As the set value of the forward travel speed of the screw 330 is higher and the upper limit P0 of the pressure is higher, a degree of freedom of the other molding conditions, such as the temperature of the cylinder 310 and the like, increases.

However, as the set value of the forward travel speed of the screw 330 is higher and the upper limit P0 of the pressure is higher, a load to the mold part 800 increases. For example, when an event of inhibiting the flow of the molding material, such as clogging of the cavity space or runner, and the like, is occurring, there is a risk of breakage of the mold part 800. Therefore, there is also an advantage in reducing the set value of the forward travel speed of the screw 330 and reducing the upper limit P0 of the pressure.

Next, an example of components different from the components in FIG. 3 will be described with reference to FIG. 7. The controller 700 is an example of the management device. The management device is a part of the injection molding machine 10 in this embodiment, but may be provided separately from the injection molding machine 10. The management device is, for example, a computer. The management device may be a host computer that manages the multiple injection molding machines 10.

Figure 7:
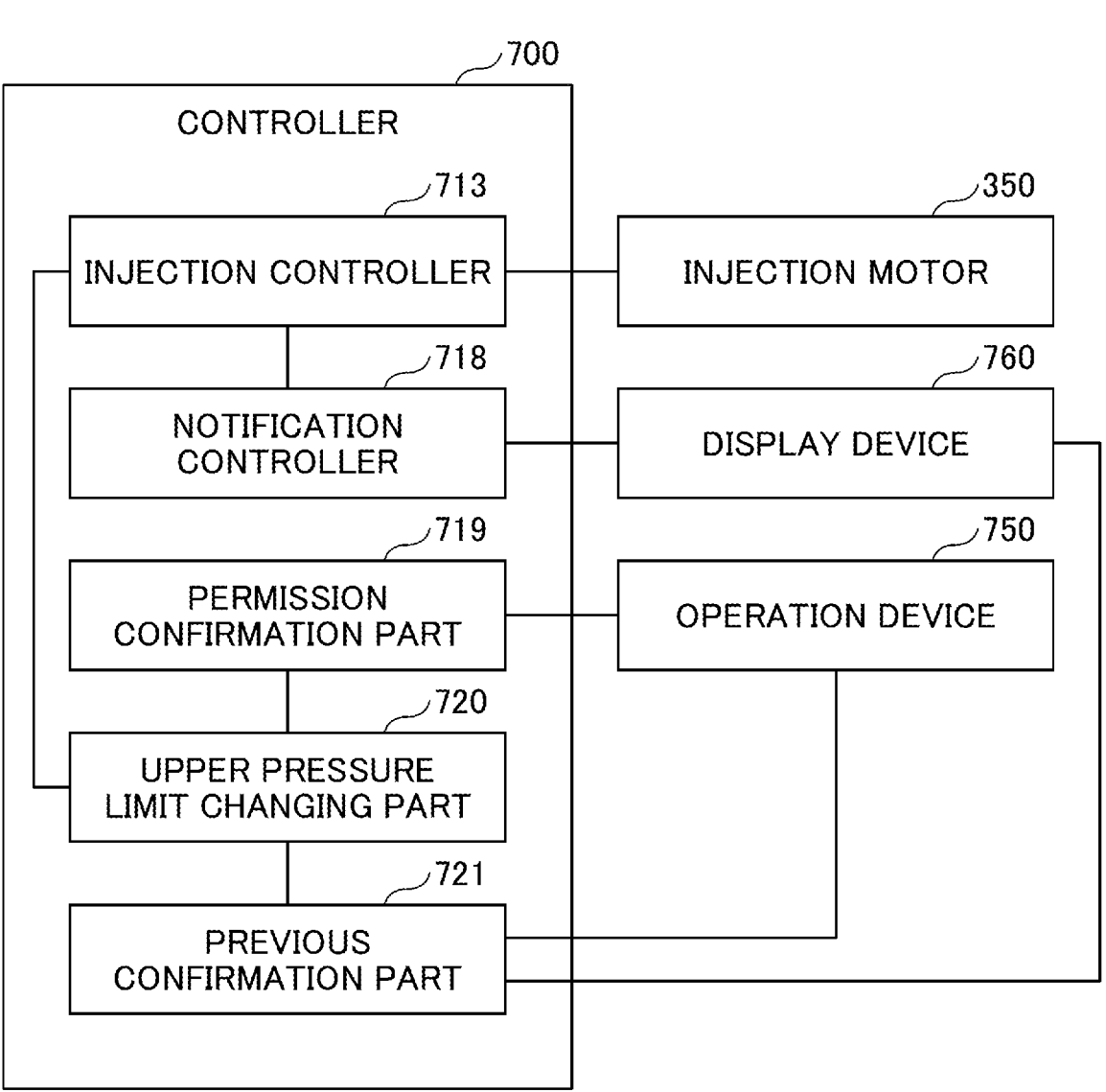
FIG. 7 is a diagram illustrating a functional block of an example of components that are different from the components in FIG. 3.

As illustrated in FIG. 7, the controller 700 includes a notification controller 718, a permission confirmation part 719, an upper pressure limit changing part 720, and a previous confirmation part 721, in addition to the injection controller 713. The notification controller 718 is configured to provide a user of the injection molding machine 10 with a notification for confirming whether or not the user permits change of the upper limit P0 of the pressure to 200 MPa or higher. The permission confirmation part 719 is configured to confirm permission of the user to the notification. The upper pressure limit changing part 720 is configured to change the upper limit P0 of the pressure to 200 MPa or higher. The previous confirmation part 721 is configured to previously receive a choice of whether or not the user of the injection molding machine 10 wishes to receive a notification for confirming his or her permission to change the upper limit P0 of the pressure. In the following, the above components will be described.

The upper pressure limit changing part 720 changes the upper limit P0 of the pressure to 200 MPa or higher when the set value of the forward travel speed of the screw 330 is from 550 mm/s through 700 mm/s and the upper limit P0 of the pressure is lower than 200 MPa in at least a part of the filling process. Thereby, the mold part 800 can be filled with the molding material in a short time, and the short shot can be suppressed.

The notification controller 718 provides the user of the injection molding machine 10 with the notification for confirming whether or not the user permits change of the upper limit P0 of the pressure before changing the upper limit P0 of the pressure to 200 MPa or higher. In order for the user to readily determine whether to permit the change of the upper limit P0 of the pressure, the notification controller 718 may additionally notify the user of (A) the set value of the forward travel speed of the screw 330, (B) the upper limit P0 of the pressure before change, (C) the upper limit P0 of the pressure after change, or any combination thereof. The notification is performed using an image, a sound, or both.

Figure 8:
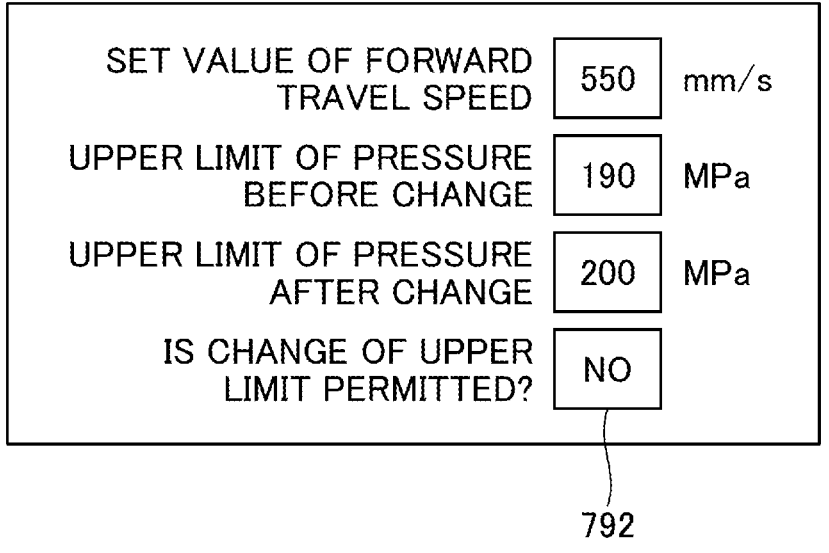
FIG. 8 is a diagram illustrating an example of a screen that provides a notification before change of an upper limit of a pressure.

For example, the notification controller 718 displays a screen 791 illustrated in FIG. 8 on the display device 760. The screen 791 includes an input part 792. The choice of whether or not the user permits the change of the upper limit P0 of the pressure to 200 MPa or higher is input to the input part 792. The user of the injection molding machine 10 inputs his or her choice to the input part 792 by operating the operation device 750 while checking the screen 791.

Alternatively, the notification controller 718 may transmit, to a portable device of the user of the injection molding machine 10, a command to display the screen 791 illustrated in FIG. 8 on the portable device. The user inputs his or her choice to the input part 792 by operating the portable device while checking the screen 791. The portable device transmits the choice, input to the input part 792, to the injection molding machine 10.

The permission confirmation part 719 confirms user's permission. For example, the permission confirmation part 719 obtains the choice input to the input part 792, thereby confirming the user's permission. The permission confirmation part 719 determines that no user's permission is obtained, at least until the choice input to the input part 792 is obtained. The permission confirmation part 719 determines whether to change the upper limit P0 of the pressure to 200 MPa or higher in accordance with the choice input to the input part 792.

The upper pressure limit changing part 720 may change the upper limit P0 to 200 MPa or higher in response to confirming the user's permission. Until confirming the user's permission, the controller 700 maintains the upper limit P0 without changing the upper limit P0 to 200 MPa or higher. This can prevent the upper pressure limit changing part 720 from changing the upper limit P0 to 200 MPa or higher without the user's knowledge.

The upper pressure limit changing part 720 may change the upper limit P0 to 200 MPa or higher without confirming the user's permission. Specifically, the upper pressure limit changing part 720 may immediately change the upper limit P0 to 200 MPa or higher without the notification controller 718 providing the notification. Immediately changing the upper limit P0 can immediately overcome molding failure. This can avoid producing a large number of rejectable products and suppress wasteful consumption of the molding material.

When the upper pressure limit changing part 720 immediately changes the upper limit P0 to 200 MPa or higher without the notification controller 718 providing the notification for confirming whether or not the user permits the change, the notification controller 718 may provide the user of the injection molding machine 10 with a notification for the change of the upper limit P0 in order to invoke the user's attention. The timing for providing the notification may be after or before change of the upper limit P0.

When the upper pressure limit changing part 720 immediately changes the upper limit P0 to 200 MPa or higher without the notification controller 718 providing the notification for confirming whether or not the user permits the change, the notification controller 718 may notify the user of, in addition to the change of the upper limit P0, (A) the set value of the forward travel speed of the screw 330, (B)

the upper limit P0 of the pressure before change, (C) the upper limit P0 of the pressure after change, or any combination thereof.

The previous confirmation part 721 receives, before providing the notification for confirming whether or not the user permits the change, a choice of whether or not the user of the injection molding machine 10 wishes to receive a notification for confirming his or her permission to change the upper limit P0 of the pressure.

Figure 9:
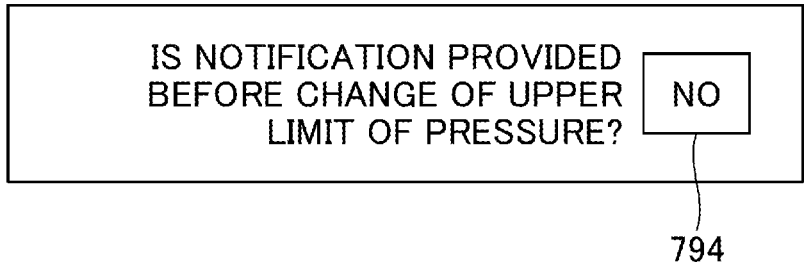
FIG. 9 is a diagram illustrating an example of a screen that is used for confirming whether to provide the notification before the change of the upper limit of the pressure.

For example, the previous confirmation part 721 displays a screen 793 illustrated in FIG. 9 on the display device 760. The screen 793 includes an input part 794. A choice of whether to confirm permission of the user of the injection molding machine 10 is input to the input part 794. The user of the injection molding machine 10 inputs his or her choice to the input part 794 by operating the operation device 750 while checking the screen 793. The previous confirmation part 721 confirms the user's intention by obtaining the choice input to the input part 794.

Alternatively, the previous confirmation part 721 may transmit, to a portable device of the user of the injection molding machine 10, a command to display the screen 793 illustrated in FIG. 9 on the portable device. The user inputs his or her choice to the input part 794 by operating the portable device while checking the screen 793. The portable device transmits the choice input to the input part 794 to the injection molding machine 10. The previous confirmation part 721 confirms the user's intention by obtaining the choice input to the input part 794.

Figure 5:
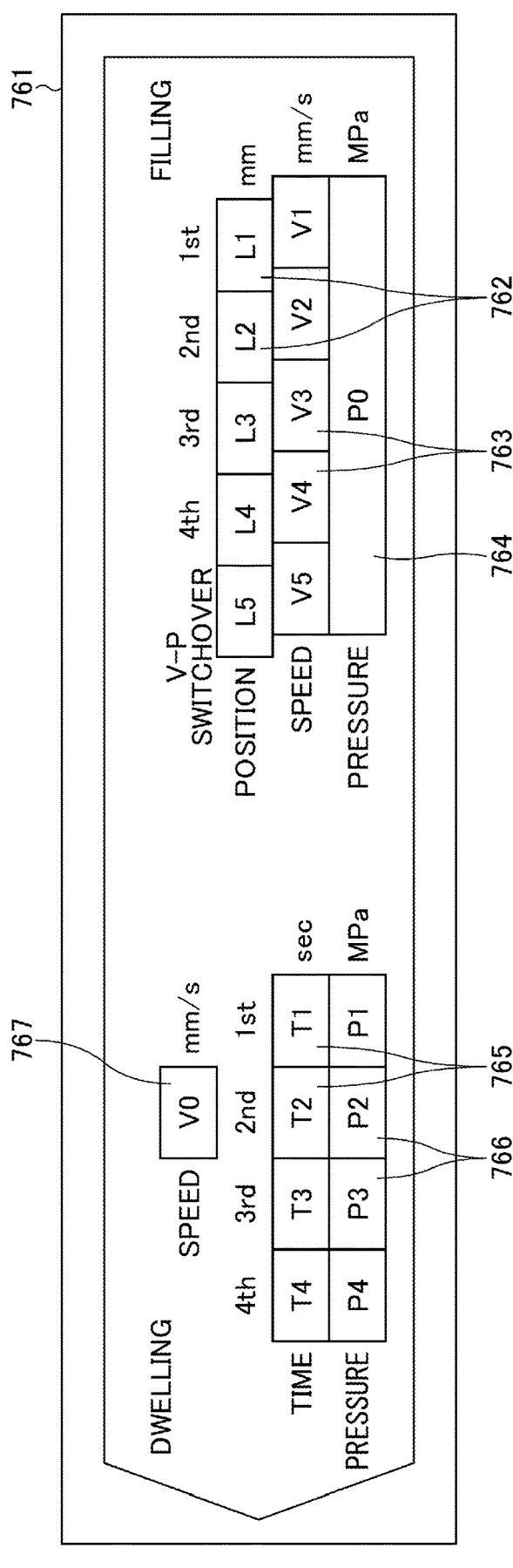
FIG. 5 is a diagram illustrating an example of a screen in relation to settings of an injection process.

Although the upper pressure limit changing part 720 changes the upper limit P0 to 200 MPa or higher in this embodiment, the user of the injection molding machine 10 may change the upper limit P0 to 200 MPa or higher while checking the screen 761 illustrated in FIG. 5. In this case, the notification controller 718 may just provide the user of the injection molding machine 10 with a notification that the upper limit P0 is too low. That is, the notification for confirming the permission is not necessary.

Although the embodiments of the controller for the injection molding machine, the injection molding machine, and the control method for the injection molding machine according to the present disclosure have been described above, the present disclosure is not limited to the above-described embodiments and the like. Various changes, modifications, substitutions, additions, deletions, and combinations are possible within the scope of claims recited. These naturally fall within the technical scope of the present disclosure.

What is claimed is:

1. A controller for an injection molding machine including an injecting member configured to push a molding material in a forward direction, the molding material containing a bioplastic; and an injection drive source configured to cause the injecting member to travel forward or backward, the controller comprising:

processing circuitry configured to perform filling in which a forward travel speed of the injecting member is controlled so that an actual value of a pressure applied from the injecting member to the molding material containing the bioplastic does not exceed an upper limit of the pressure, wherein in at least a part of the filling, a value of from 550 mm/s through 700 mm/s is settable as a set value of the forward travel speed of the injecting member, and a value of 200 MPa or higher is settable as the upper limit of the pressure.

2. The controller for the injection molding machine according to claim 1, wherein in at least the part of the filling, a value of from 650 mm/s through 700 mm/s is settable as the set value of the forward travel speed of the injecting member, and the value of 200 MPa or higher is settable as the upper limit of the pressure.

3. The controller for the injection molding machine according to claim 2, wherein a thickness of at least a part of a molded product is 1.0 mm or smaller, the molded product being formed of the molding material.

4. The controller for the injection molding machine according to claim 2, wherein in at least the part of the filling, the processing circuitry is configured to change the upper limit of the pressure to 200 MPa or higher in a case in which the value of from 550 mm/s through 700 mm/s is settable as the set value of the forward travel speed of the injecting member, and a value of lower than 200 MPa is settable as the upper limit of the pressure.

5. An injection molding machine, comprising:
the controller according to claim 2;
the injecting member; and
the injection drive source.

6. The controller for the injection molding machine according to claim 1, wherein a thickness of at least a part of a molded product is 1.0 mm or smaller, the molded product being formed of the molding material.

7. The controller for the injection molding machine according to claim 1, wherein in at least the part of the filling, the processing circuitry is configured to change the upper limit of the pressure to 200 MPa or higher in a case in which the value of from 550 mm/s through 700 mm/s is settable as the set value of the forward travel speed of the injecting member, and a value of lower than 200 MPa is settable as the upper limit of the pressure.

8. The controller for the injection molding machine according to claim 7, wherein the processing circuitry is configured to provide a user of the injection molding machine with a notification for confirming whether or not the user permits change of the upper limit of the pressure before changing the upper limit of the pressure, and then change the upper limit of the pressure to 200 MPa or higher in response to confirming permission of the user.

9. An injection molding machine, comprising:
the controller according to claim 1;
the injecting member; and
the injection drive source.

10. A control method for an injection molding machine including an injecting member configured to push a molding material in a forward direction, the molding material containing a bioplastic; and an injection drive source configured to cause the injecting member to travel forward or backward, the control method comprising:

performing filling in which a forward travel speed of the injecting member is controlled so that an actual value of a pressure applied from the injecting member to the molding material containing the bioplastic does not exceed an upper limit of the pressure, wherein in at least a part of the filling, a value of from 550 mm/s through 700 mm/s is settable as a set value of the forward travel speed of the injecting member, and a value of 200 MPa or higher is settable as the upper limit of the pressure.

\* \* \* \* \*